US005469202A

United States Patent [19]
Stephens

[11] Patent Number: 5,469,202
[45] Date of Patent: Nov. 21, 1995

[54] CONTINUOUS INK JET CATCHER WITH IMPROVED SCREEN STRUCTURE

[75] Inventor: David J. Stephens, Springboro, Ohio

[73] Assignee: Scitex Digital Printing, Inc., Dayton, Ohio

[21] Appl. No.: 855,994

[22] Filed: Mar. 20, 1992

[51] Int. Cl.[6] .......... G01D 15/18
[52] U.S. Cl. .......... 347/90
[58] Field of Search .......... 347/90, 93, 31; 210/499

[56] References Cited

U.S. PATENT DOCUMENTS

| | | | |
|---|---|---|---|
| 3,611,422 | 10/1975 | Rourke | 347/90 |
| 4,010,477 | 3/1977 | Frey | 347/74 |
| 4,183,029 | 1/1980 | Isayama et al. | 347/93 |
| 4,250,510 | 2/1981 | Dressler | 347/76 |
| 4,418,352 | 11/1983 | Horike et al. | 347/80 |
| 4,445,124 | 4/1984 | Fujii et al. | 347/89 |
| 4,460,903 | 7/1984 | Guenther et al. | 347/90 |
| 4,560,991 | 12/1985 | Schutrum | 347/76 |
| 4,757,328 | 7/1988 | Braun et al. | 347/90 |
| 4,994,821 | 2/1991 | Fagerquist | 347/81 |
| 5,105,205 | 4/1992 | Fagerquist | 347/90 |

*Primary Examiner*—Robert Beatty
*Attorney, Agent, or Firm*—Barbara Joan Haushalter

[57] ABSTRACT

A catcher for an ink jet print head is provided with locating features in the catcher throat to positively locate a catcher screen that serves to wick caught ink into the catcher throat, and a screen construction that resists compression of the screen without adversely affecting the ink flow in the catcher throat.

5 Claims, 2 Drawing Sheets

CONTINUOUS INK JET CATCHER WITH IMPROVED SCREEN STRUCTURE

FIELD OF THE INVENTION

The present invention relates to drop-catcher devices for continuous ink jet printing apparatus and, more specifically, to improved flow control constructions for controlling the flow of caught ink.

BACKGROUND OF THE INVENTION

In general, continuous ink jet printing apparatus have a print head manifold cavity to which ink is supplied under pressure so as to issue in streams from a print head orifice plate that is in liquid communication with the cavity. Periodic perturbations are imposed on the liquid streams, e.g. vibrations by an electromechanical transducer, to cause the streams to break up into uniformly sized and shaped droplets. A charge plate, comprising an array of addressable electrodes, is located proximate the break-off points of the streams to induce an electrical charge, selectively, on adjacent droplets, in accord with print information signals. Charged droplets are deflected from their normal trajectory; e.g. in one common (binary) printing mode, charged (non-print) droplets are deflected into a catcher device and non-charged droplets proceed to the print medium.

A number of different catcher devices have been developed as constructions to intercept and recirculate the non-print droplets from such print heads. The catcher devices must take several potential problems into account. First, the catcher device must intercept the non-print ink droplets in a way that avoids splattering them onto the print medium, or scattering into an ink mist, which also can cause defects on the print media. Second, the catcher devices must effectively remove the caught ink away from the droplet interception zone so that a build-up of ink in the catching surface does not block the flight path of printing drops.

Where the catcher is moving during the print operation or where the droplet stream is not vertical (so that ink in the discharge channel is subjected to transverse gravitational forces) efficient collection of caught ink can be frustrated. Also, when the catcher is part of a moveable print head assembly, acceleration forces can cause ink at its catcher throat to be slung away from the catcher. Slung ink masses can appear on the print media as defects or contaminate the machine. Even where the acceleration forces are not sufficient to sling the ink, they can cause dynamic buckling of the ink film just entering the catcher throat. The buckled ink film can obstruct ink droplets which should pass to the print media, which cause splatter and/or "white defects," as a result of the droplet interception.

A solution to the above problems is proposed in U.S. Pat. No. 5,105,205 which describes a continuous ink jet catcher device having a screen in the catcher throat for improved flow control of caught ink. Referring to FIG. 9, a partial cross-sectional schematic view of the prior art catcher assembly generally designated 18 includes a catcher body 30 defining a catcher face 20, a catcher throat 22 and a screen 48 in the catcher throat. The screen 48 is folded as shown in FIG. 9 and inserted into the catcher throat 22 after construction of the catcher 18. To be effective, the screen 48 in the catcher throat 22 must be held flush to the catcher face 20 and must encompass the entire throat opening 22. Experience has shown that the prior art construction suffers from the lack of means to positively locate the screen. The screen has been observed to shift positions in the throat and render the screen ineffective. In worst cases, the screen 48 has fallen out of the catcher assembly. Furthermore, through routine handling during the manufacturing process or handling of the print head during installation and removal, the screen shape can become compressed to the point of being rendered useless.

SUMMARY OF THE INVENTION

It is therefore the object of the present invention to provide improved screen construction for use in a continuous ink jet print head catcher assembly with resulting improvements in control of the caught ink. A catcher assembly construction according to the present invention includes a catcher body defining a catcher throat and screen means disposed in the catcher throat for wicking ink into the catcher throat, the screen means having a first relatively fine mesh screen portion folded around a second relatively coarse mesh screen portion, whereby the fine mesh screen portion is protected against compression. According to another feature of the invention, means are provided in the catcher throat for cooperating with the screen for physically locating the screen in the throat.

MODES OF CARRYING OUT THE INVENTION

Figure 1:
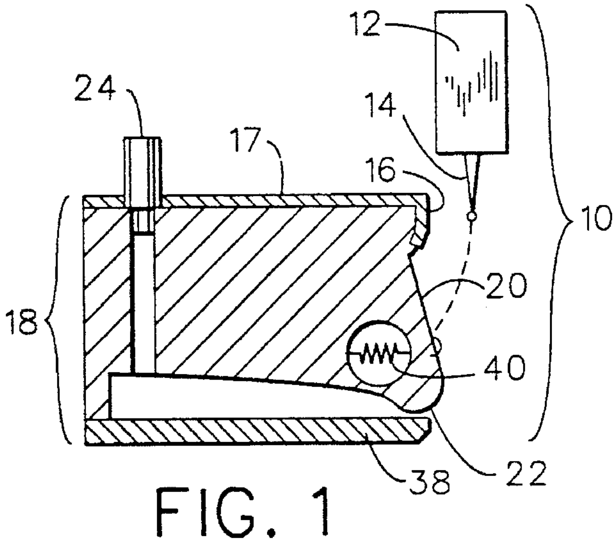
FIG. 1 is a schematic side view of an ink jet print head useful with a catcher screen according to the present invention.

A schematic side view of an ink jet print head of the type employed with the present invention is shown in FIG. 1. The print head, generally designated 10, includes a resonator assembly 12 having an ink manifold and orifice plate (not shown) for generating filaments of ink 14. The resonator stimulates the filaments to break off into droplets in the region of charging electrodes 16 on a catcher assembly generally designated 18. Drops of ink are selectively charged by the charging electrodes and deflected onto a catcher face 20 and into a catcher throat 22. Uncharged drops proceed undeflected to a print medium (not shown). Collected ink is withdrawn through a catcher tube 24 and is recirculated.

Figure 2:
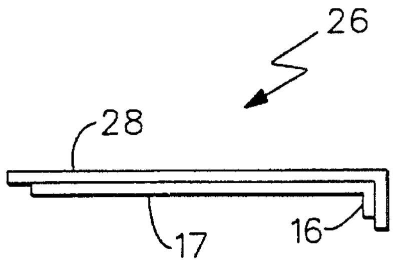
FIG. 2 is a schematic side view of an electrode coupon employed with the catcher assembly of the present invention.

The construction of the catcher assembly 18 will now be described in further detail. FIG. 2 shows a side view of an electrode coupon 26 formed as taught by U.S. Pat. No. 4,560,991 issued Dec. 24, 1985 to W. Schutrum. The electrode coupon 26 includes a plurality of charging electrodes 16 and conductors 17 formed by electroplating on an etchable substrate 28 such as copper foil.

Figure 3:
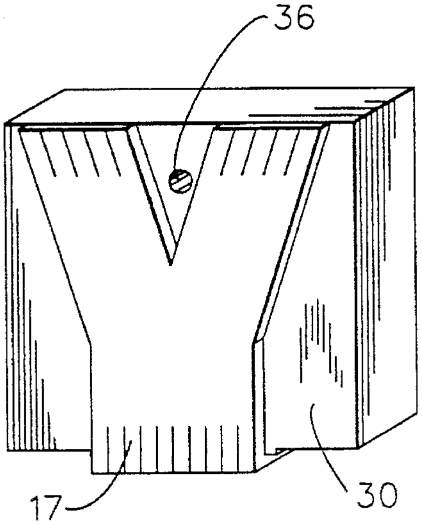
FIG. 3 is a top view of the catcher assembly shown in FIG. 1.

A top view of the catcher assembly body 30 is shown in FIG. 3. In manufacture, the electrode coupon 26 was attached by epoxy to the top of the catcher body 30 and the substrate 28 removed by etching to leave the conductor 17 and charging electrodes 16 on the catcher assembly body 30.

Figure 4:
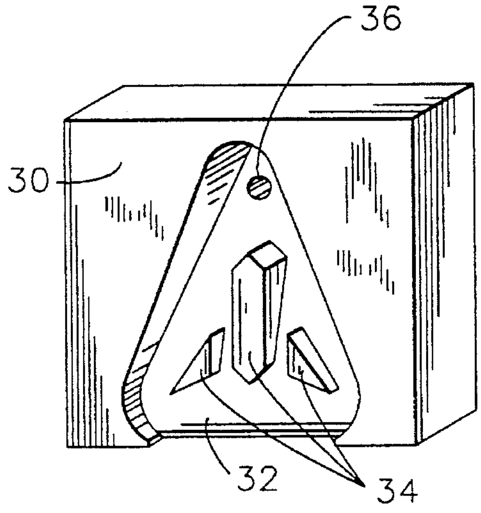
FIG. 4 is a bottom perspective view of the catcher assembly body.

A bottom view of the catcher assembly body 30 is shown in FIG. 4. A recess 32 is molded into the bottom of the catcher body 30, with lands 34 projecting into the recess. A hole 36 for receiving the catcher tube 24 is provided through the catcher body 30 into the recess 32.

Figure 5:
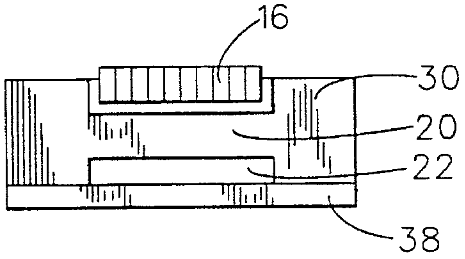
FIG. 5 is a front view of the catcher assembly shown in FIG. 1.

FIG. 5 shows a front view of catcher assembly 18. A catcher plate 38 is bonded to the bottom of the catcher body 30, for example, with epoxy resin, to enclose recess 32 and define catcher throat 22.

Returning now to FIG. 1, the catcher assembly is provided with a resistive heater 40 embedded in the catcher body for controlling condensation of moisture on the catcher face 20 and charging electrodes 16.

Figure 6:
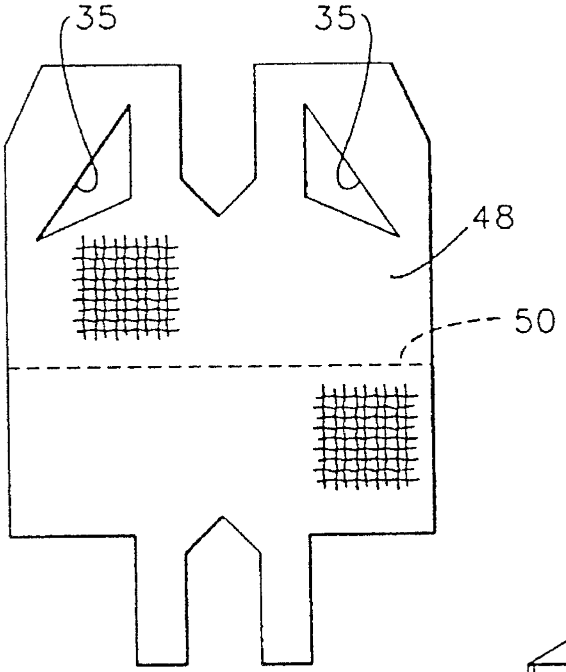
FIG. 6 is a schematic plan view of a screen form used in the catcher throat according to the present invention.
Figure 7:
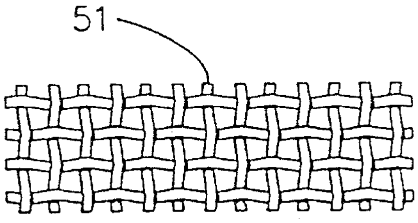
FIG. 7 is a plan view of a spacer screen employed with the screen form of FIG. 6 according to the present invention.
Figure 8:
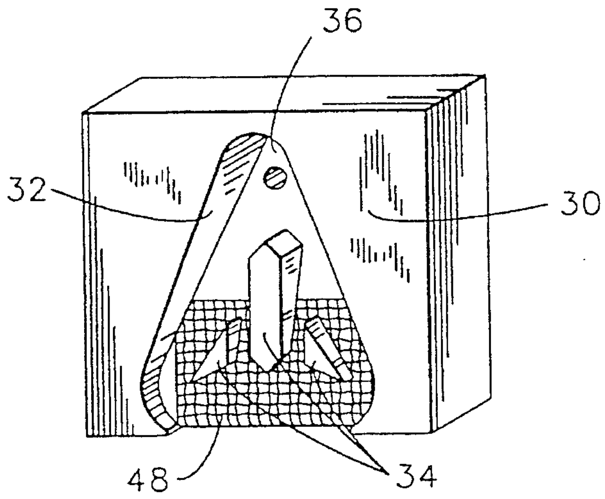
FIG. 8 is a perspective view of the bottom of the catcher body with the screen form inserted.
Figure 9:
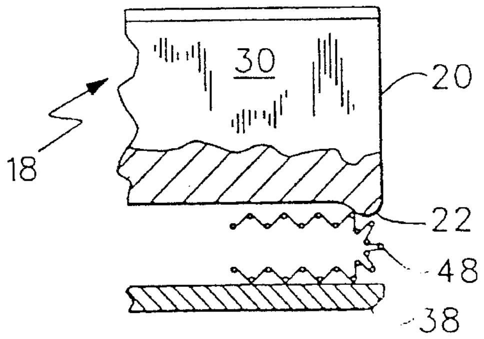
FIG. 9 (PRIOR ART)
FIG. 9 is schematic side view, partially broken away, showing a catcher body having a screen in the catcher throat according to the prior art.

According to the present invention, a fine mesh screen form 48 shown in FIG. 6 is folded along a line 50 around a thick mesh insert 51 shown in FIG. 7 to form a screen sandwich and the screen form sandwich is inserted into the catcher body recess 32 as shown in FIG. 8. The lands 34 cooperate with locating features 35 in the screen form to positively locate the screen form in the catcher body throat. The catcher throat screen 48 serves to wick ink into the catcher throat as described in U.S. Pat. No. 5,105,205. The coarse mesh insert 51 prevents the fine mesh screen 48 from collapsing in the catcher throat but does not adversely affect the pressure drop in the catcher throat. After assembly, the catcher plate 38 is bonded to the bottom of the catcher body 30 to retain the screen in the catcher throat 22.

An ink jet print head having a one inch wide array of charging electrodes 16 was prepared according to the present invention employing a fine mesh screen of 325 mesh 0.0014 inch diameter stainless steel wire screen (twilled square weave) and a thick mesh insert of 30 mesh 0.011 inch diameter wire screen (plain square weave). The locating features in the catcher throat positively located the catcher screen at the desired location, and the thick mesh insert prevented the thin mesh screen from collapsing without adversely affecting ink flow and pressure drop in the catcher throat.

Figure 10:
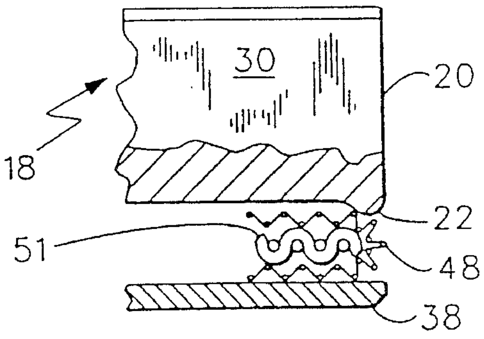
FIG. 10 is a schematic side view, partially broken away, of a catcher body showing a screen in the catcher throat according to the present invention.

Referring now to FIG. 10, a schematic side view of a catcher assembly having a screen according to the present invention is shown. The catcher assembly 18 includes a catcher body 30 defining a catcher throat 22 with a fine mesh screen 48 located in the catcher throat 22. A coarse mesh insert 51 folded into the fine mesh insert 48 prevents the coarse mesh insert from collapsing in the catcher throat 22. A catcher plate 38 forms the bottom of the catcher assembly 18.

ADVANTAGES

The catcher assembly, according to the present invention, is particularly advantageous in that the catcher throat screen is positively located in the catcher throat and will not become dislodged due to acceleration of the print head. A further advantage occurs in that the catcher screen resists compression due to the coarse mesh insert without adversely affecting flow properties of ink in the catcher.

The invention has been described in detail with particular reference to certain preferred embodiments thereof, but it will be understood that variations and modifications can be effected within the spirit and scope of the invention.

I claim:

1. A catcher assembly in an ink jet print head, comprising:

a) a catcher body defining a catcher throat; and b) screen means disposed in said catcher throat for wicking ink into said catcher throat, said screen means having a first relatively fine mesh screen portion folded around a second relatively coarse screen portion, whereby the fine mesh screen is protected against compression.

2. A catcher assembly in an ink jet print head, comprising:

a) a catcher body defining a catcher throat;

b) screen means disposed in said catcher throat for wicking caught ink into said throat, said screen means including a first relatively fine mesh screen portion folded around a second relatively coarse mesh screen portion, whereby the fine mesh screen is protected against compression; and c) said body defining locating feature means cooperating with said screen means for physically locating said screen means in said throat.

3. In a continuous ink jet printer of the kind having linear orifice means for producing a curtain of parallel drop streams, an improved drop catcher device, comprising:

a) a catcher body constructed with elongated drop impact surface and located adjacent a region of said drop stream curtain so that said drop stream curtain impacts said impact surface;

b) means defining a drop discharge channel downstream from said drop impact surface, said channel having an elongated ingress mouth that is approximately parallel to said orifice means;

c) first screen means comprising a plurality of uniformly sized and spaced apertures located across the channel ingress mouth;

d) said first screen means extending within said channel, downstream along the direction of ink discharge, as well as across said channel; and e) second screen means comprising a plurality of uniformly sized and spaced apertures located between said first screen means along said channel to protect said first screen means against compression.

4. A continuous ink jet printer as claimed in claim 3 wherein said second screen means comprises a screen element having thickness and spacing significantly larger than said first screen means.

5. A continuous ink jet printer as claimed in claim 3 further comprising locating means in said catcher body to positively locate said first screen means to maintain said first screen means substantially flush with said drop impact surface.

* * * * *